United States Patent [19]

Illetschko et al.

[11] Patent Number: 5,055,920

[45] Date of Patent: Oct. 8, 1991

[54] STILL PICTURE DECODER FOR COLOR TELEVISION SIGNALS HAVING A PHASE CHANGING COLOR CARRIER

[75] Inventors: Gerhard Illetschko, Darmstadt; Hans-Peter Richter, Gross-Bieberau; Reiner Noske, Darmstadt, all of Fed. Rep. of Germany

[73] Assignee: BTS Broadcast Television Systems GmbH, Darmstadt, Fed. Rep. of Germany

[21] Appl. No.: 462,541

[22] Filed: Jan. 9, 1990

[30] Foreign Application Priority Data

Jan. 10, 1989 [DE] Fed. Rep. of Germany ....... 3900490

[51] Int. Cl.⁵ .......................................... H04N 5/213
[52] U.S. Cl. .................................... 358/36; 358/105; 358/166; 358/167
[58] Field of Search ................ 358/21 R, 24, 105, 36, 358/37, 160, 905, 143, 142, 166, 167

[56] References Cited

U.S. PATENT DOCUMENTS

| | | | |
|---|---|---|---|
| 4,242,704 | 12/1980 | Ito | 358/36 |
| 4,549,213 | 10/1985 | Illetschko | 358/167 |
| 4,593,316 | 6/1986 | Kellar | 358/166 |
| 4,639,783 | 1/1987 | Fling | 358/166 |
| 4,639,784 | 1/1987 | Fling | 358/166 |
| 4,716,462 | 12/1987 | Wargo | 358/166 |

OTHER PUBLICATIONS

Broadcast Engineering, Nov. 1980, pp. 42–49.

Primary Examiner—Tommy P. Chin
Attorney, Agent, or Firm—Frishauf, Holtz, Goodman & Woodward

[57] ABSTRACT

Color television signals obtained by scanning a still picture are converted into digital video signals and stored in video frame memory for delaying the signals. Undelayed and delayed digital video signals are added together to produce a luminance signal in which the color carrier is suppressed. A circuit for detecting a change of picture provides a start signal after which the first frame of a still picture is stored and is then recycled until there is another picture change. To reduce the effect of recycling, the continuously supplied picture signal is modified by a factor of 1−k, and the recycled picture is modified by the factor k, wherein k varies between 0 and 1 (or 100%) and is a gradually rising function whose rise time extends over a multiplicity, for example 2–4, video frame periods.

10 Claims, 4 Drawing Sheets

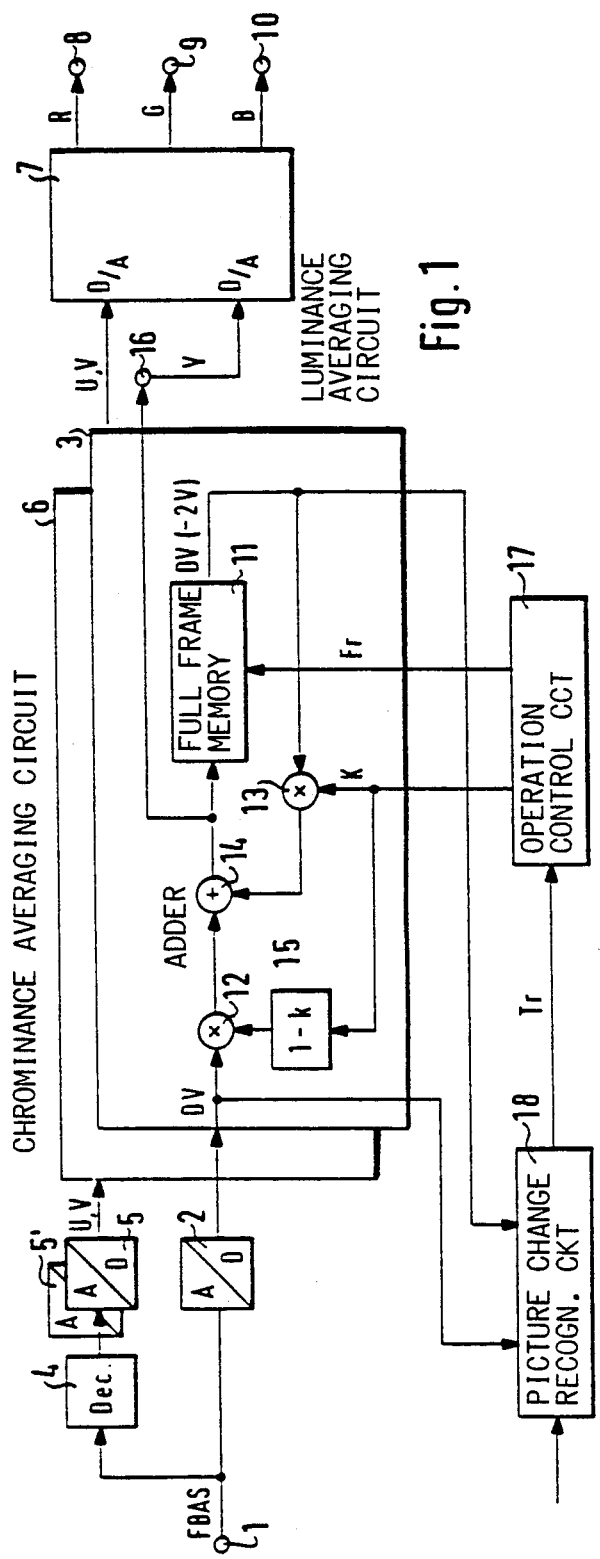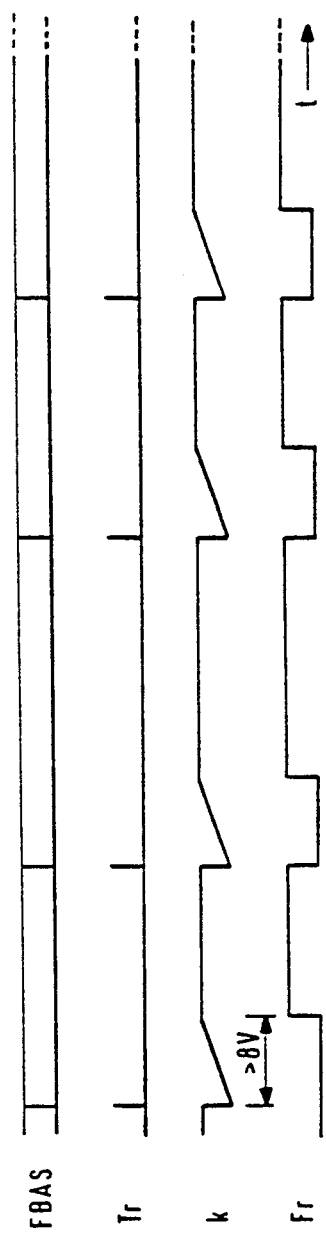

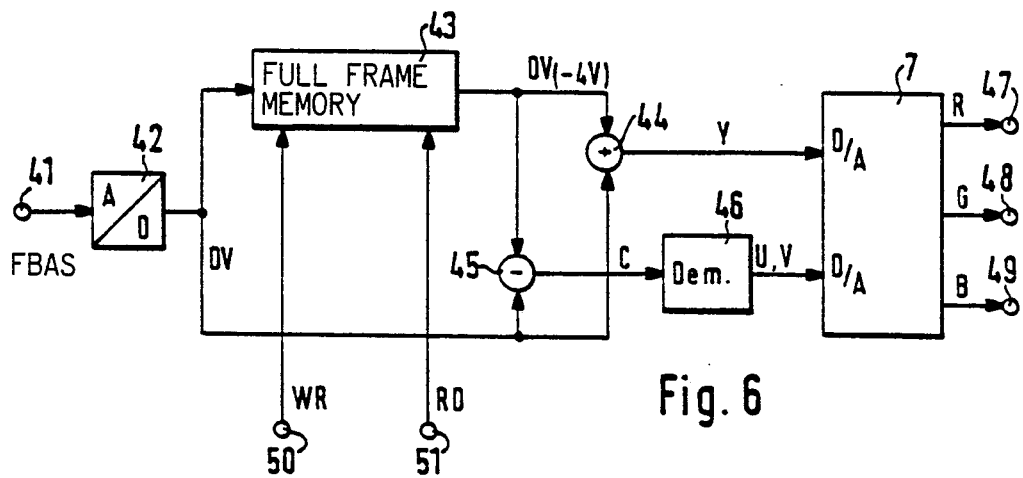
Fig. 6
Fig.7a
Fig.7b
Fig.7c
Fig.7d
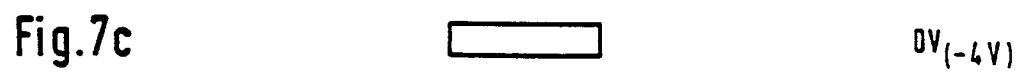
Fig.7e
Fig.7f
Fig.7g
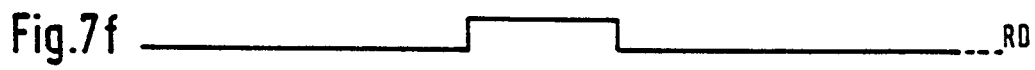
Fig.7h
Fig.7i

STILL PICTURE DECODER FOR COLOR TELEVISION SIGNALS HAVING A PHASE CHANGING COLOR CARRIER

FIELD OF THE INVENTION

This invention concerns decoding of still picture color television signals which conform to the PAL standard or to some other standard having a similar coupling of the periodic modification of the color carrier timed by the synchronizing signals.

BACKGROUND

Known circuits for decoding such television signals utilize notch filters or line comb filters for separating the chrominance component from the luminance component of the signals. In such arrangements, according to the particular embodiments, various kinds of disturbances arise, as for example a shrinking of the luminance bandwidth which, in effect, is a decrease of luminance resolution or crosstalk, known as cross color or cross luminance

SUMMARY OF THE INVENTION

It is an object of the present invention to provide a system for decoding of color television signals which are produced during the scanning of a still picture in which the above-mentioned disturbances do not occur.

Briefly, the system first converts the color television signals into digital video signals and then it stores the video signals in a video frame memory while the picture remains still. Means are provided for adding undelayed and delayed digital signals having a delay such that a luminance signal is made available with suppression of the chrominance signal. This is typically a one frame (2V) delay so that the color signal cancels out wherein V represents the vertical scan of a field. In the adding together of the delayed and undelayed signals the respective contributions of the undelayed and delayed signals is first modified by a control signal and its unity complement, is changing from 0 to 100% and from 100% to 0 respectively.

The invention has the advantage that the decoding of still pictures is carried out without the above-mentioned disturbances and at the same time that the noise superimposed on the color television signals is reduced The system is useable for fading still pictures in and out or from one to another by putting the control signal through its full range over a period of many video frames, such as 10 to 30 frames. The fading process can be started as soon as it it detected that a still picture has been replaced by another still picture. Such detection can be provided by comparing the delayed and undelayed digital video signals.

BRIEF DESCRIPTION OF THE DRAWINGS

Further details useful in the practice of the invention could best be understood in connection with the illustrated description that follows, referring to the annexed drawings, in which:

FIG. 1 is a block circuit diagram of the first embodiment of a color television signal decoding system of the invention;

FIGS. 2a, 2b, 2c and 2d are timing diagrams for explaining the operation of the embodiment of FIG. 1;

FIG. 6 is a block circuit diagram of a second embodiment of a decoding system according to the invention;

FIGS. 7a, 7b, 7c, 7d, 7e, 7f, 7g, 7h and 7i are timing diagrams for explaining the operation of the embodiment of FIG. 6.

In the several figures the same components are shown with the same reference numerals and symbols. The carrier frequency chrominance signal is designated in the figures with C, and the chrominance signal in the baseband is designated by U, V independently of its specific form.

DESCRIPTION OF THE ILLUSTRATED EMBODIMENTS

Figure 3:
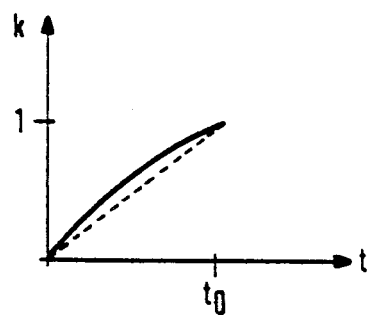
FIG. 3 is a graph for explaining the course of the control signal that is produced in the embodiment of FIG. 1.

The examples of embodiments illustrated in the drawings relate to color television signals according to the PAL standard and method. The system of the invention is also useful, however, for decoding of television signals according to other standards and methods of generation in which a similar type of coupling of the auxiliary color carrier with the synchronizing signals is provided. This coupling is illustrated in FIG. 7b.

A composite color television signal, designated by the acronym FBAS commonly used in some countries where the PAL standard is in general use, is shown as being supplied to the input 1 of the system of FIG. 1. This signal, including its luminance component, its chrominance component and its superposed noise, is then supplied through an analog-to-digital converter 2 to an averaging circuit 3 for the luminance channel. The chrominance signal is obtained by itself by means of a decoder 4 which includes a demodulator and may for example contain a bandfilter or a line comb filter. Following the decoder 4, two additional analog-to-digital converters 5, 5' and another averaging circuit 6 are provided for the chrominance signals U, V which after decoding still contain cross-color signals and noise.

The luminance signal Y and the chrominance signal U, V which respectively appear at the outputs of the averaging circuits 3 and 6 are supplied to a signal processing circuit 7 which converts the digital signals Y and U, V into analog signals and by means of a matrix, and produces the color value signals R, G, B. The averaging circuit 3 contains a full frame memory 11, two multipliers 12, 13, an addition circuit 14 and a circuit 15 for producing unity complements. The digital video signal DV proceeds from the output of the analog-to-digital converter 2 through the first multiplier 12 and the addition circuit 14 to the input of the full frame picture memory 11. The output of the memory 11 is connected through the second multiplier 13 to the addition circuit 14. By means of the multipliers 12 and 13 the digital video signals DV and the delayed video signals $DV_{(-2V)}$ are respectively multiplied by mutually complementary control signals $1-k$ and $k$. If $k=0$, the undelayed digital video signals DV are supplied at full amplitude from the output of the multiplier 12. If, however, k=1 and therefore 1−k is 0, no undelayed digital video signals are supplied to the addition circuit 14.

Instead of the circuit just described with its two multipliers, a circuit with one multiplier could be used. For the particular case of a noise reducer equipment, both of these possibilities are explained in Broadcast Engineering, Nov. 1980, pgs. 42–49 especially pg. 46, FIGS. 4 and 5. In accordance with a feature of the invention, the factor k is controlled by circuit 17 in a specific manner to reduce noise interference, see FIG. 2c, varying between a value of 0 to 1 (or 100%) over a multiple of video frame periods (V).

Beginning at a particular time that needs to be determined, the control signal k is brought from 0 to 1 during several television frames by the operation control circuit 17. This circuit receives, a start signal Tr from a picture change recognition circuit 18. The start signal or pulse Tr preferably occurs at the beginning of a new still picture. The start pulse can be generated either manually by means of a suitable keyboard or control panel or by the picture change recognition circuit 18, which compares the stored and newly incoming digital video signals with each other. If desired the start signal can also be automatically generated in the equipment which delivers the color television signal—for example, a dia or transparency scanner.

OPERATION

If k=0, the undelayed digital video signals DV are supplied at full amplitude from the output of the multiplier 12. The output signals of the multiplier 13 in that case are 0, so that the undelayed digital video signal signals also remain unchanged in the addition circuit and reach the output 16 of the averaging circuit without change. If, however, k=1 and therefore 1−k is 0, no undelayed digital video signals are supplied to the addition circuit 14. The multiplier 13 nevertheless supplies the delayed digital video signals $DV_{(-2V)}$ at full amplitude to following circuits, so that the delayed digital video signals are onc again stored and delayed.

FIGS. 2a–2d are timing diagrams for further explanation of the operation of the circuit of FIG. 1. FIG. 2a shows the time sequence of four different pictures, which are each scanned for the duration of several full frame periods. FIG. 2b shows the start signal Tr, which is generated either picture. In accordance with a feature of the invention, the control signal k, following the start signal Tr, picture. Following the start signal Tr the control signal k rises gradually from 0 to the value 1. The duration of this rise should extend over at least 8 picture field periods (8V) in the case of a PAL color television signal. For a practical embodiment it has been found that a duration value between 20V and 30V, wherein V represents the vehicle scan of a field, is particularly favorable. Once k reaches the value 1, it remains at this value until the end of the picture in question. During this time no "new" signals obtained by the scanning of the picture are given any effect. Since, however, errors, for example rounding errors, may arise in the circulation of the stored signals, which errors may increase with repeated recycling, the memory 11 is switched into a read-only mode by means of a freeze signal Fr. generated in control circuit 17. The signal Fr is shown in FIG. 2d.

The control signal k can rise linearly as shown in FIG. 2c. It has been found in practical experiments that a function $k=(t/t_0)^x$ is better, where x lies in the region between 0.5 and 1 and $t_0$ lies between 8V and 30V. Such a function is illustrated in FIG. 3 by the solid curve; a linear rise is shown by a straight broken line for comparison.

Figure 4:
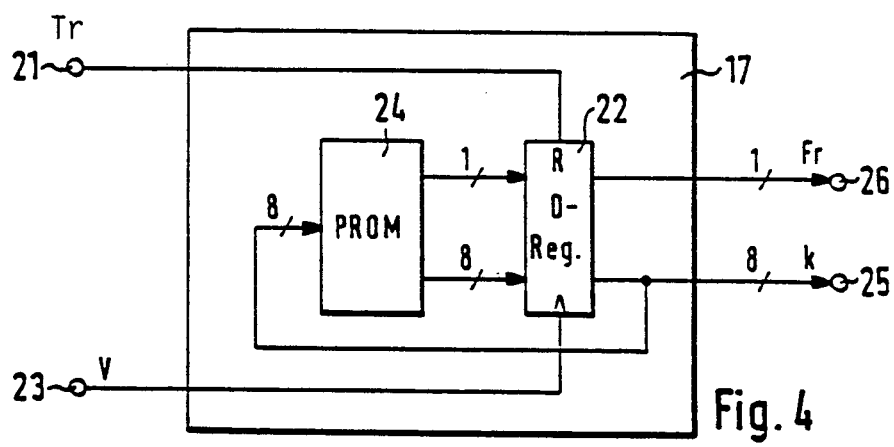
FIG. 4 is a block circuit diagram of an operation control circuit for use in the embodiment of FIG. 1.

FIG. 4 shows an example of an operation control circuit 17 suitable for use in the system of FIG. 1, to which the start pulse Tr is supplied at 21, as a reset pulse for a D register 22. The D register 22 is clocked with a vertical scan frequency pulse V which is supplied to a terminal 23 for the clock input of the D register. The D-register 22 and the read only memory (PROM) 24 together provide a recursive arrangement that is advanced by one step with every V pulse. The D-register contains 8 storage places for the 8-bit wide control signal k which is made available at an output 25. An additional storage place is provided in the D register for the signal $F_r$ that can be taken from an output 26 and supplied to the full frame memory 11 of FIG. 1. The 8-bit wide output 25 is also connected to the 8-bit wide address input of the PROM 24, while the outputs of the PROM 24 are connected to data inputs of the D-register 22.

In the PROM 24 the time course of the control signal k is stored in such a way that at every address which corresponds to a value of k, the next in time value of k is stored. Thus with every V pulse a new value is read out of the PROM 24. Once k reaches the value 1, the 9th place of the output signals of the PROM 24 is also set at 1, so that the signal Fr is generated.

Figure 5:
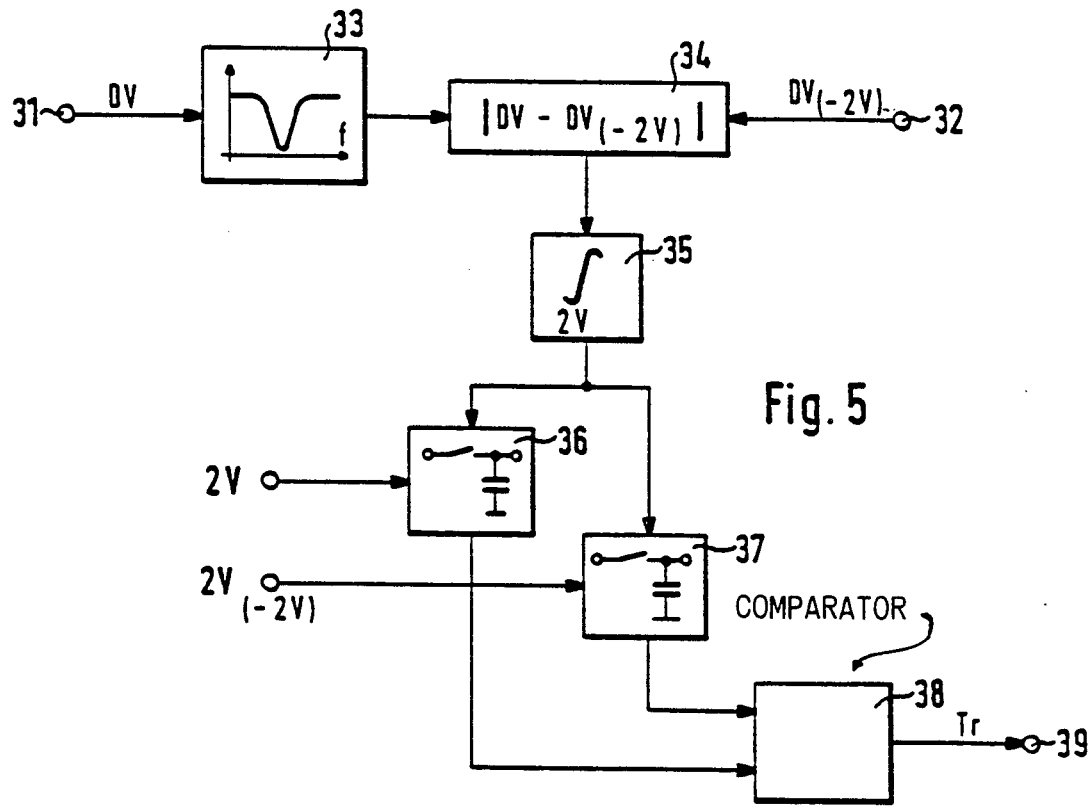
FIG. 5 is a block circuit diagram for a picture change recognition circuit for use in the embodiment of FIG. 1.

FIG. 5 shows a circuit for automatic picture change recognition. The undelayed and delayed digital video signal inputs are brought from the averaging circuit 3 of FIG. 1 to inputs 31 and 32 of the circuit of FIG. 5. Since the undelayed digital video signals are not yet separated from the color carrier, so that even without a picture change differences would result, a color carrier trap 33 is connected in the line leading from the input 31. The amount of the difference between the undelayed digital video signal DV and the delayed digital signal DV(−2V) is detected in a circuit 34. The difference D is summed over every complete frame in an integrator 35. The results of the summing in the circuit 35 for two successive frames are supplied, by means of two sample and hold circuits 36 and 37, to a comparator 38. When differences exist the start pulse Tr is produced at the output 39 of the comparator 38 and that pulse is then transmitted to the operation control circuit 17 of FIG. 1.

In the embodiment illustrated in FIG. 6 the composite color television signal, i.e. the FBAS, is supplied over the input 41 to an analog-to-digital converter 42. The digital video signals so produced are intermediately stored in a full frame memory 43 and applied to respective inputs of addition circuit 44 and a subtraction circuit 45. The other inputs of the addition circuit 44 and of the subtraction circuit 45 have applied to them digital video signals $DV_{(-4V)}$ read out of the memory 43, these video signals being delayed with respect to the digital video signals DV by 4 picture field periods. As a result, in the case of addition at 44 there is an erasure or suppression of the auxiliary color carrier, while in the case of subtraction at 45 the luminance component is reduced to 0-both only if the picture content is not changed. As a further advantage there is a noise reduction of 3 DB. From the chrominance signal C obtained from the subtraction circuit 45, which is digital but of carrier frequency, a chrominance signal U, V in the baseband may be generated by means of a demodulator 46, which is then converted into the analog color value signals R, G, B by means of the circuit 7. These color value signals are available at the outputs 47, 48 and 49 of the circuit 7. Over the inputs 50 and 51 the control signals for writing (WR) and reading (RD) are supplied to the full frame memory 43.

The timing diagrams of FIGS. 7a–7i provide further explanation of the operation of the circuit of FIG. 6. In FIG. 7a the sequence of supplied color television signals is schematically represented. Each rectangular box represents a full frame, hence a complete picture. A good many frames, of which only three are shown in FIG. 7a represent a picture 1. Thereafter a picture 2 is scanned, of which only the first frame is shown. Every first frame of a picture is written into the frame memory 43 by means of the write-in signal WR and is read-out delayed by two frames, i.e., by four fields (4V). This read-out is provided by the read out signal RD which is shown in FIG. 7f. FIG. 7c shows the first frame with the content of picture 1 which is read out from the frame memory 43 delayed by 4V. In FIGS. 7b and 7d there is shown in each case an oscillation of the auxiliary color carrier in order to show the contemporaneous phase. For this purpose the scale is greatly magnified compared with the other representations. A comparison of FIGS. 7b and 7d shows that by an addition of the undelayed and 4V delayed signals the auxiliary color carrier is wiped out. An FBAS signal shown in FIG. 7g is correspondingly subdivided into a luminance signal FIG. 7h and a carrier frequency chrominance signal FIG. 7i.

Figure 8:
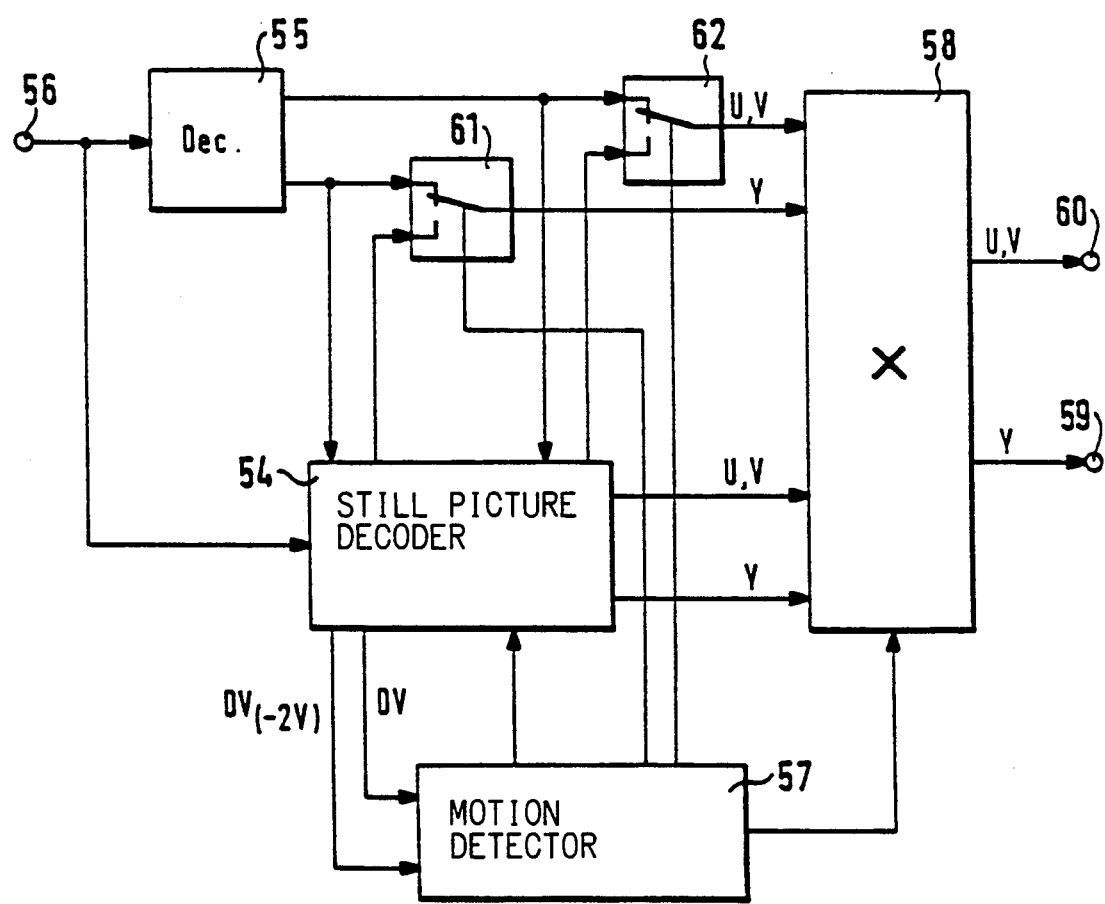
FIG. 8 is a circuit block diagram of a third embodiment which is suitable not only for decoding of still picture signals, but also for decoding of color television signals obtained from scanning moving pictures.

FIG. 8 shows a combination of a decoding circuit for still pictures according to the invention—in what follows referred to as a still picture decoder—with a conventional decoder. In this way the advantages of the stillpicture decoder can also be used in the case of color television signals which only partly, or for certain time intervals, correspond to still pictures. For this purpose, in addition to a still picture decoder 54, a conventional decoder 55 with a line comb filter or a notch filter is provided. The FBAS signal is supplied through an input 56 to both decoders. From the still picture decoder 54 an undelayed video signal and a video signal delayed by 2V are supplied to a motion detector 57. Motion detectors are known in many forms and can recognize according to how they are built whether two successive pictures are present or which partial regions of a picture are subjected to changes. A circuit according to FIG. 5 can also be used to serve as such a motion detector. It should be mentioned that motion detectors are also available that operate pixel-wise, line-wise or frame-wise.

The motion detector 57 controls a fader 58, through which the output signals of the still picture decoder 54 and, over the controllable switches 61 and 62 the output signals of the decoder 55 can be supplied. In dependence on the presence of motion, either the output signal of the still picture decoder or the output signal of the decoder 55 is supplied to the outputs 59 and 60 of the fader 58. In this connection it is, for one thing, possible for both the luminance and the chrominance signal of motion-containing pictures, and for still pictures to be decoded separately and correspondingly faded over. According to the requirements in the individual case, however, only the luminance component may be separately decoded and faded, while the chrominance component is taken from the decoder 55 both for moving pictures and still pictures.

The still picture decoder 54 can also be used as a noise reducer. By control with the help of the motion detector 57 it is possible during the decoding of color television signals of moving pictures for the still picture decoder then operating as a noise reducer to be switched in by the change-over switches 61 and 62 between the outputs of the decoder 55 and the fader circuit 58.

The luminance signal of the averaging circuit 3 of FIG. 1 and the chrominance signal of the averaging circuit 6 are then supplied to the still picture decoder 54. The control signal k is set at a value between 0 and 1, as a result of which the still picture decoder operates as a noise reducer in a manner which, as such, already known.

Although the invention has been described with reference to particular illustrative examples, it will be understood that variations and modifications are possible within the inventive concept.

We claim:

1. A system for decoding color television picture signals subject to noise from still or unvarying pictures, wherein a color television signal includes a color carrier signal, or chrominance signal, portion and a luminance signal portion (Y), and synchronizing signals for synchronizing said chrominance signal portion (UV) and said luminance signal portion (Y), having means (2, 4, 5, 42) for converting aid color TV signal portions into a digital chrominance signal and a digital luminance signal;

memory means (11, 43) for storing at least one (Y) of said digital video signals while the picture is still;

means (11, 44) for obtaining from said memory means (11, 43) a digital video luminance signal which is delayed by an integral number, which is at least one and less than three, of video frames and thereby producing a delayed digital luminance signal;

adding means (14) for adding said delayed digital luminance signal to a digital video luminance signal which was not delayed, to thereby provide a sum digital video luminance signal; and the improvement comprising, an arrangement for clarifying the luminance signal portion (Y), said arrangement including a control signal generating means (17) furnishing a control coefficient (k) signal which varies in signal value or level between 0 and 1, or 100%;

means (18, 21) for generating a start signal (Tr) upon scanning of a picture, and means (13, 15, 12) for modifying said undelayed digital video luminance signal and said delayed digital luminance signal prior to their addition in said adding means for determining the relative contribution of said respective signals to said sum digital video luminance signal under control of said control coefficient signal;

and wherein said control signal generating means (17) includes means for varying the signal level or value of said control coefficient signal beginning at the time of occurrence of said start signal (Tr) over a multiplicity of video frame periods from a minimum value to a predetermined larger value.

2. The system of claim 1, wherein said modifying means comprises a first multiplier (12) coupled to receive said undelayed digital video luminance signal of the color TV picture signal in digital form and to said control signal generating means to receive a signal representative of the complement of said control coefficient (k) signal for multiplication therein, and a second multiplier (13) coupled to receive said delayed digital video luminance signal and said control coefficient (k) signal for multiplication therein;

and wherein said adding means (14) is coupled to receive the outputs from, respectively, said first multiplier (12) and said second multiplier (13).

3. The system of claim 2, further including a complement forming circuit (15) coupled to said control signal generating means (17) and to said first multiplier (12) to form the complement of said control coefficient (k) signal, for application to said first multiplier.

4. The system of claim 2, wherein said converting means further includes analog-digital converter means (2, 5) coupled to receive said color television picture signals for converting said color television picture signals into said digital chrominance and luminance signals of the color television picture signals; and wherein said memory means (11), said adding means (14), said first multiplier (12) and said second multiplier (13), combined, form an averaging circuit (3) for said luminance portion (Y) of the color television signal, in digital form;

wherein a decoder (4) is provided, separating and decoding the chrominance signal portion from said color television picture signal;

wherein said analog-digital converter means (5) is provided in said converting means for converting said chrominance signal portion into a digital chrominance signal;

and wherein an averaging circuit (6) is provided for receiving said digital chrominance signal.

5. The system of claim 1, wherein said means for obtaining said delayed digital video luminance signal comprises a recursive or feedback circuit coupled to an output of said memory means (11) for having a signal applied thereto representative of the digital video luminance signal which is delayed with respect to the arrival of said digital video luminance signal at the memory means (11).

6. The system of claim 1, wherein said means for generating the start signal (Tr) comprises a picture change recognition circuit (18) receiving an input representative of the color TV picture signal, in digital form, and a further signal representative of said delayed digital video luminance picture signal, and for comparing said input and said further signal and, upon recognizing non-identity, generating said start signal (Tr).

7. The system of claim 1, wherein said memory means are means (45) for storing both said digital chrominance signal and said digital luminance signal for two video frames and futher comprising:

means (50, 51; WR, RD) for writing in and reading out said digital chrominance signal and said digital luminance signal in the interleaved order in which they arrive in a composite digital color television signal into and from said full-frame memory means (43) for producing interleaved digital luminance and chrominance signals delayed by two video frames and;

and subtraction means (45) for subtracting the delayed interleaved digital signals from undelayed interleaved digital and chrominance signals, and providing an output of chrominance signal carrier frequency, in digital form, in which the luminance component is reduced to zero provided the picture is still or unvarying.

8. The system of claim 1, further including:

a fader (58) having a control input and at least three video inputs;

a second decoder (55) of conventional form, for decoding said color television picture signals either before or after conversion by said converting means when there is variation in the picture content thereof;

a motion detector (57) having inputs connected to outputs of said second decoder for providing an output signal representative of whether there is variation in said picture content;

and switching means (61, 62) for selectively supplying to said fader, in the alternative, at least one of digital luminance and chrominance outputs from said memory means for storing at least one digital signal while the picture is still or both digital luminance and chrominance outputs of said second decoder, said motion detector also providing a control input signal for said fader.

9. A method of clarifying the luminance signal portion of a color TV signal, particularly for reproduction of still or unvarying pictures in a color television picture system from color television picture signals subject to noise, comprising the steps of:

storing a luminance portion (Y) in digital form, of said color TV picture signal;

delaying the luminance portion;

feeding back said delayed luminance portion and combining aid delayed luminance portion with the luminance portions of subsequent TV picture frames by adding said delayed luminance portion signal to said luminance portions of subsequent TV frames, and the improvement comprising the steps of modifying the addition of said signals by a factor of between 0 and 1 of said respectively added signals prior to their addition to determine their relative contriution to a sum derived by said addition in accordance with said factor (k), and the forming of said factor (k) by a gradually varying value, changing from a low to a high value during a period extending over a multiplicity of video frame periods.

10. The method of claim 9, wherein said modification step comprises varying the value of subsequent TV luminance portions (Y) by a factor which is complementary $(1-k)$ to said factor (k) while, simultaneously, varying said delayed digital video luminance portions by said factor (k).

* * * * *